United States Patent
Paquet et al.

(10) Patent No.: US 6,821,543 B1
(45) Date of Patent: Nov. 23, 2004

(54) LOW ACIDITY FERMENTED DAIRY PRODUCTS FLAVORED WITH WARM FLAVORS

(75) Inventors: Denis Paquet, Clamart (FR); Jean-Pierre Caron, Madrid (FR); Jacques De Villeroche, Versailles (FR); David Lam, Montesson (FR); Paul Skrochowski, Quincy sous Senard (FR); Stéphane Doat, Chatenay Malabry (FR); Nathalie Trial, Anthony (FR); Blas Tarodo De La Fuente, Assas (FR); Jean-Louis Cuq, Saint Clement de Riviere (FR)

(73) Assignee: Compagnie Gervais Danone, Levallois-Perret (FR)

( * ) Notice: Subject to any disclaimer, the term of this patent is extended or adjusted under 35 U.S.C. 154(b) by 0 days.

(21) Appl. No.: 09/806,821

(22) PCT Filed: Oct. 5, 1998

(86) PCT No.: PCT/FR98/02120

§ 371 (c)(1),
(2), (4) Date: Sep. 7, 2001

(87) PCT Pub. No.: WO00/19831

PCT Pub. Date: Apr. 13, 2000

(51) Int. Cl.$^7$ .................................................. A23C 9/00
(52) U.S. Cl. .................... 426/580; 426/34; 426/474; 426/490; 426/491; 426/583
(58) Field of Search ......................... 426/34, 41, 42, 426/43, 474, 475, 477, 478, 490, 491, 580, 583

(56) References Cited

U.S. PATENT DOCUMENTS 4,228,189 A    10/1980   Henson et al. ................. 426/40

FOREIGN PATENT DOCUMENTS

| DE | 2122904 | 11/1972 |
|---|---|---|
| EP | 0 233 566 A2 | 8/1987 |
| FR | 886051 | 10/1943 |
| FR | 2 197 521 | 3/1974 |
| FR | 2 224 096 | 10/1974 |
| FR | 2 665 057 | 1/1992 |

OTHER PUBLICATIONS

H. F. Haggag et al., "Production of Zabadi, from Ultrafiltered Buffalo's Milk,", *Food Chemistry*, Jan. 1, 1988, vol. 30, pp. 29–36.

Kosikowski, F., "Properties of commercial flavoured frozen yogurts," J Food Protection, 44(11):853–856, 1981.

Speck, M., "Properties of non–fruit yogurt," Cultured Dairy Products J, 18(4):6–9, 1983.

*Primary Examiner*—Leslie Wong
(74) *Attorney, Agent, or Firm*—Morgan Lewis & Bockius LLP

(57) ABSTRACT

The invention concerns fermented dairy products whereof the Dornic acidity ranges from 20 to 80° D, the pH from 4.5 to 5.5, flavored with a warm flavour such as chocolate, caramel, vanilla, coffee, burnt almond, nougat, walnut, hazelnut, almond, peanut, cashew nut. The dairy raw material is treated in order to reduce its mineral salts and/or its protein contents, then subjected to fermentation by a lactic ferment.

12 Claims, 2 Drawing Sheets

LOW ACIDITY FERMENTED DAIRY PRODUCTS FLAVORED WITH WARM FLAVORS

This application is a 371 of PCT/FR98/02120 filed Oct. 5, 1998.

The present invention relates to new fermented dairy products flavoured by the incorporation of warm flavours.

The general name "warm" flavours is used to designate flavours such as chocolate, caramel, vanilla, coffee, praline, nougat and/or the flavours of oleaginous fruits (walnut, hazelnut, almond, pistachio nut, cashew nut), and the like.

These aromas, which are generally in great demand from consumers, are widely used in the food industry for the manufacture of desserts. However, their use for flavouring fermented dairy products (for example of the type including yoghourt, milk drinks, fromage frais or derivatives thereof) is limited.

Although fermented dairy products (in particular of the yoghourt type) flavoured with warm flavours are proposed commercially, they are not appreciated by the majority of consumers because of the presence of an aftertaste which alters the true taste of the flavours used.

The inventors have now observed that this organoleptic incompatibility between warm flavours and fermented dairy products was essentially due to the acidity of the latter, which results from the production of lactic acid, causing a reduction of the pH, during fermentation.

Fermented diary products normally have a pH after fermentation of between 4 and 5 approximately, and a Dornic acidity greater than 80° D, generally between 80 and 150° D approximately, depending on their protein content.

The Dornic acidity reflects the buffering capacity of the dairy product during its fermentation; it is expressed in degrees Dornic (° D): one degree Dornic corresponds to the quantity (in ml) of N/9 sodium hydroxide necessary to bring the pH of the product to pH=8.3, or alternatively the quantity of lactic acid (in mg) in 10 ml of product.

The inventors have discovered that if the Dornic acidity of a fermented dairy product was reduced while its pH was kept at a value less than or equal to 5, a preparation was obtained which could be flavoured with "warm" flavours without denaturing them.

The subject of the present invention is a flavoured fermented dairy product characterized in that its Dornic acidity is 20 to 80 degrees Dornic, preferably 30 to 70° D, and advantageously 40 to 60° D, its pH is 4 to 5.5, preferably 4.5 to 4.9, and in that it is flavoured with a warm flavour.

Preferably, the said warm flavour is chosen from chocolate, caramel, vanilla, coffee, praline, nougat, walnut, hazelnut, almond, pistachio nut and cashew nut flavours and the like.

Although an acidity of up to 80° D can sometimes be acceptable, for example in the case of certain products flavoured with chocolate, it is preferable in most cases, for an optimum preservation of the organoleptic qualities, especially when flavours such as coffee are used, that the acidity does not exceed 70° D, and advantageously 60° D.

Preferably, the flavoured fermented dairy products in accordance with the invention have a protein content (w/w) of 1 to 10%, and advantageously of 2 to 6.5%.

According to a preferred embodiment of a flavoured fermented dairy product in accordance with the present invention, it is a product of the yoghourt type or of the fromage frais type, characterized in that, for a protein content (w/w) of 2% to 10%, and a fat content (w/w) of less than or equal to 15% approximately, preferably of 3 to 12%, its pH is 4 to 5.5, and its Dornic acidity is 20 to 120° D, preferably 40 to 70° D.

According to another preferred embodiment of a flavoured fermented dairy product in accordance with the present invention, it is a product of the fermented drink type, characterized in that, for a protein content (w/w) of 1% to 5%, and a fat content (w/w) of less than or equal to 5% approximately, preferably of the order of 1.5%, its pH is 4 to 5 and its Dornic acidity is 20 to 70° D, preferably 30 to 60° D.

For the production of a fermented dairy product in accordance with the present invention, the fermentation of a dairy raw material is carried out by at least one microorganism capable of performing lactic acid fermentation; it represents in particular microorganisms normally used in lactic ferments, such as Lactobacillus sp., Lactococcus sp., as well as Bifidobacteriae sp., and in particular in yoghourt ferments; preferably, at least one lactic acid bacterium chosen from the group consisting of *Lactobacillus bulgaricus* and *Streptococcus thermophilus* will be used.

The dairy raw materials which can be used for carrying out the present invention are obtained by reducing the buffering capacity of milk, by demineralization and/or by reducing the content of proteins, in particular of calcium phosphocaseinate. The milk used may be derived from any mammalian species, or may be a mixture of milk from various species; it may be, as a whole or in part, milk reconstituted from powdered milk; it may optionally be partially or fully skimmed, supplemented or otherwise with vitamins, sugars or mineral salts.

The reduction in the protein and mineral salt concentration may be obtained by diluting the milk; the demineralization may be obtained by removing the mineral salts either solely from the soluble phase of the milk, or from the soluble phase and from the micellar phase.

To reduce the mineral salt concentration of the soluble phase of the milk, it is possible to carry out a diafiltration, especially on an ultrafiltration membrane, and/or a dilution. The dilution makes it possible, in addition, to also reduce the protein concentration.

The diafiltration of the milk can be carried out directly against water. It is also possible to concentrate the proteins beforehand by ultrafiltration on a membrane. Advantageously, the VCF (volume concentration factor) is 1.2 to 5; a retentate is thereby obtained which has a protein content of 3.8 to 18%.

This retentate is then subjected to diafiltration and/or to dilution.

The diafiltration rate (corresponding to the number of volumes of water added and to the number of volumes of permeate removed through the ultrafiltration membrane, relative to the volume of milk or of ultrafiltration retentate) is advantageously 0.5 to 5.

The dilution rate is advantageously less than or equal to 9, depending on the mineral salt and protein concentration desired for the product which will be subjected to fermentation.

To demineralize both the soluble phase and the micellar phase of the milk, the inventors have developed a process using partial demineralization of the milk under $CO_2$ pressure, followed by a rise in the pH of the demineralized milk, by degassing.

The subject of the present invention is also this process which comprises at least:

a) the solubilization of $CO_2$ under pressure (carbonation), in a milk (optionally diluted or concentrated beforehand), whose protein concentration is between about 25 and about 150 g/l, in order to reduce the pH of the said milk to a value of between 5 and 6.5, preferably between 5 and 5.8;

b) the partial removal, by diafiltration under $CO_2$ pressure, of the soluble mineral salts (namely the minerals initially present in the soluble phase of the milk, and the mineral salts released from the micellar phase by the acidification), until a calcium quantity per gram of protein equal to 30% to 80%, preferably 40 to 70%, of the initial quantity is obtained;

c) the increase in the pH of the diafiltration retentate, by removal of the $CO_2$ (decarbonation), until there is a return to a pH close to the pH of a non-carbonated milk having the same protein concentration as that of the said diafiltration retentate.

According to a preferred embodiment of the process in accordance with the present invention, the milk used is concentrated, until the desired protein concentration is obtained, either prior to the carbonation of step a), or during the diafiltration of step b).

According to another embodiment of the process in accordance with the invention, the decarbonation of step c) is carried out until there is a return to a pH at least equal to 6.2 and preferably greater than or equal to 6.4.

According to yet another embodiment of the process in accordance with the invention, steps a) and b) are carried out at a temperature of between 0 and 20° C., and step c) at a temperature of about 20° C. to 70° C. and preferably between 20 and 40° C.

The pH obtained at the end of step a) depends on the quantity of $CO_2$ solubilized in the aqueous phase, which itself depends on the pressure used and on the temperature of solution.

Figure 1:
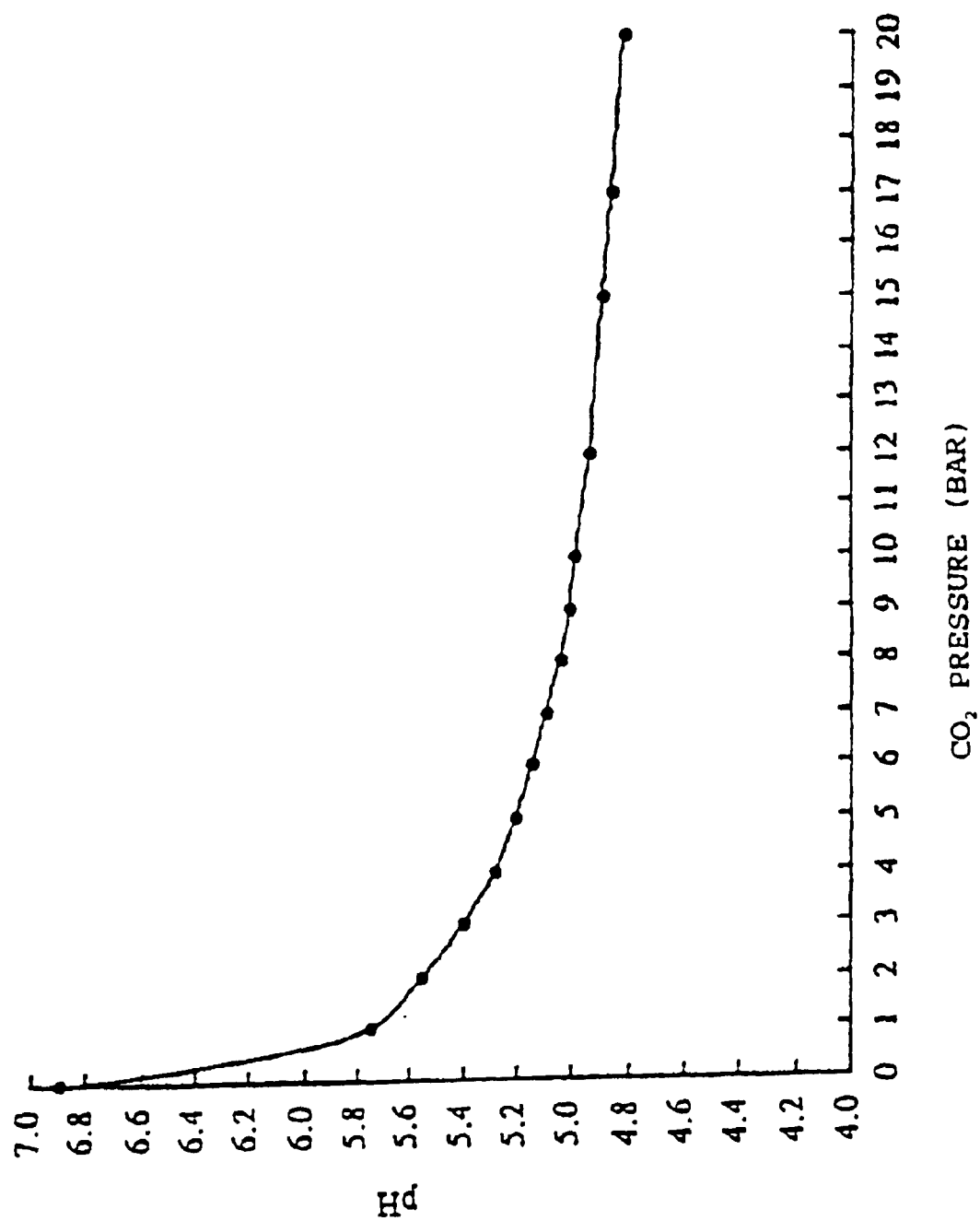
FIG. 1 represents a chart which makes it possible to determine the $CO_2$ saturation pressure to be applied during carbonation, in the case of a low-fat milk at 4° C., in order to obtain a given pH (values at $CO_2$ saturation equilibrium).
Figure 2:
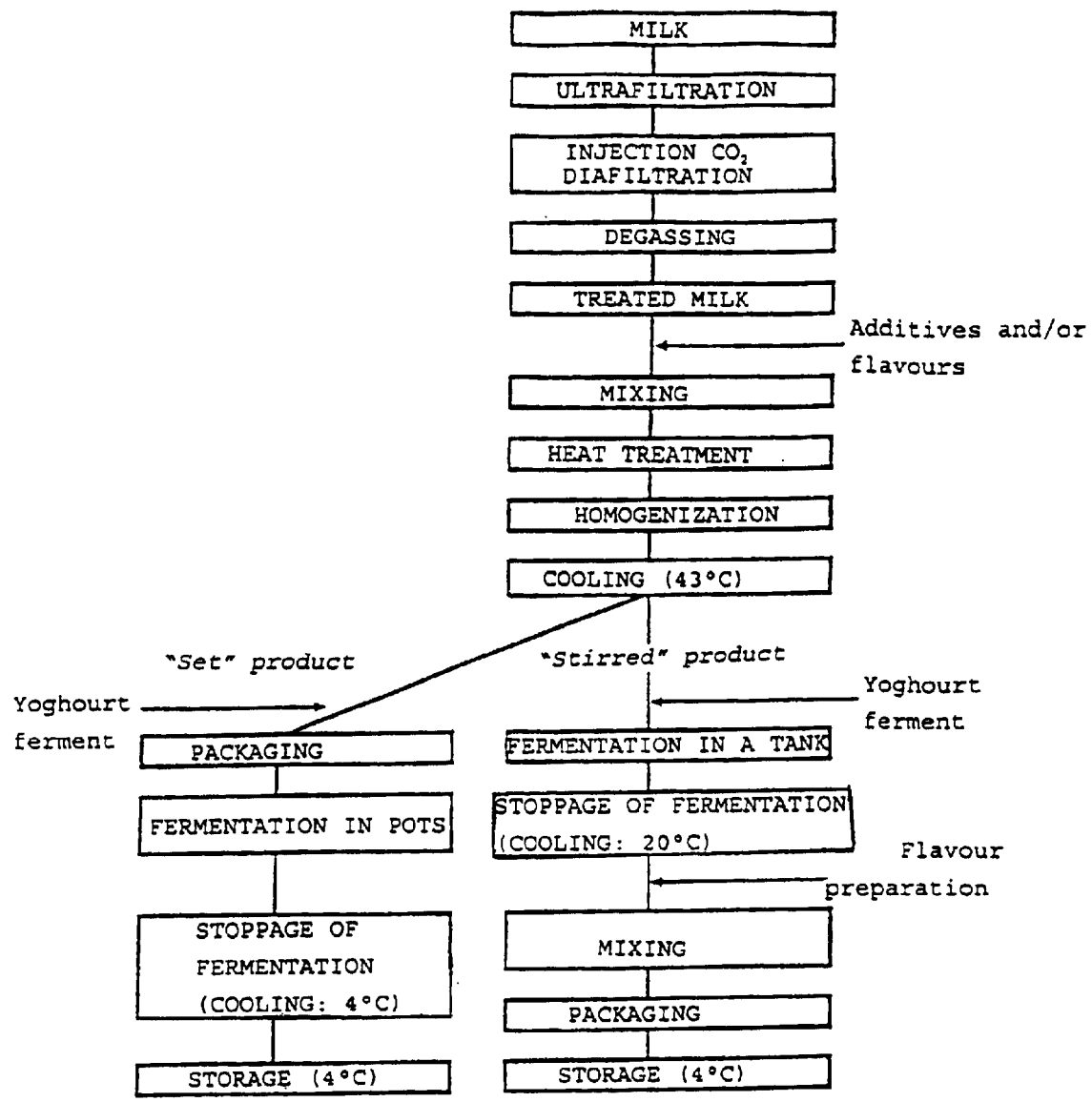
FIG. 2 represents a diagram of the various stages of two preferred embodiments of the process in accordance with the present invention.

The degassing causes a return of the carbon dioxide gas from the dissolved state to the gaseous state (decarbonation).

The dairy raw material obtained by the process in accordance with the invention can, in addition, be diluted, as indicated above, at a dilution rate advantageously less than or equal to 9.

The process in accordance with the invention makes it possible to obtain the removal of 40 to 70% of the minerals from the milk.

Prior to the fermentation, the dairy raw materials obtained by the process of demineralization of the soluble phase and of the micellar phase in accordance with the invention, or by one of the other processes described above which make it possible to reduce the buffering capacity, may be optionally subjected to a heat treatment, of the pasteurization or sterilization type, at a temperature of between 60° C. and 150° C., preferably between 72 and 140° C., for a period of between 1 second and 20 minutes.

These dairy raw materials can also be supplemented with various additives which make it possible to facilitate the fermentation (by compensating for the loss of nutrients resulting from the diafiltration, such as for example lactose, amino acids and peptides, vitamins, enzymes and the like), or (in particular in the case of products whose protein concentration has been reduced by dilution) to obtain a thicker texture.

If it is desired to obtain a thicker texture, in particular in the case of products whose protein concentration has been reduced by dilution, it may be necessary to compensate for the loss of proteins, in particular of micellar casein, with texturing agents, and/or dietary caseinate and/or vegetable proteins.

Texturing agents which can be used are in particular thickeners, gelling agents, emulsifiers, dietary stabilizers such as for example starches and derivatives thereof, gelatin, gums and the like.

Dietary caseinates which can be used are in particular calcium, sodium, potassium and ammonium caseinates.

Vegetable proteins which can be used are for example soya milk, soya concentrates and isolates.

The warm flavour preparation may also, if desired, be added before fermentation.

The fermentation by lactic ferments is carried out according to conventional procedures. The usual lactic ferments, namely Lactobacillus sp., Lactococcus sp., as well as Bifidobacteriae sp., and in particular the ferments used for the manufacture of yoghourts can be used within the framework of the process in accordance with the invention; preferably, at least one lactic acid bacterium chosen from the group consisting of *Lactobacillus bulgaricus* and *Streptococcus thermophilus* will be used.

The invention also covers fermented dairy products which can be obtained by fermenting a dairy raw material resulting from the process of demineralization of the liquid phase and of the micellar phase in accordance with the invention, optionally supplemented as indicated above.

The fermented dairy products in accordance with the invention, as well as the fermented dairy products obtained from dairy raw material resulting from one of the other processes described above which make it possible to reduce the buffering capacity, constitute a "white material" to which there will be added, in order to obtain a fermented dairy product in accordance with the invention, a warm flavour preparation, if it has not been previously added to the fermentation.

Fermented dairy products which can be used as "white material" for the production of the flavoured products in accordance with the invention are for example:

thick products of the yoghourt or fromage frais type, characterized in that, for a protein content (w/w) of between 7% and 15%, and a fat content (w/w) of less than or equal to 15% approximately, preferably between 3 and 12%, their pH is between 4 and 5.5, and their Dornic acidity between 60 and 120° D, preferably 70 to 110° D;

products of the yoghourt type, characterized in that, for a protein content (w/w) of between 4% and 7%, and a fat content (w/w) of less than or equal to 10% approximately, preferably between 0 and 5%, their pH is between 4 and 5.5, and their Dornic acidity between 30 and 90° D, preferably 50 to 70° D;

products of the fermented drink type, characterized in that, for a protein content (w/w) of between 2% and 5%, and a fat content (w/w) of less than or equal to 5% approximately, preferably of the order of 1.5%, their pH is between 4 and 5 and their Dornic acidity between 30 and 70° D, preferably between 40 and 60° D.

These fermented dairy products can in particular be obtained by fermenting a dairy raw material resulting from the process of demineralization of the liquid phase and the micellar phase in accordance with the invention.

If necessary, in order to obtain the pH and the Dornic acidity which characterize the flavoured products in accordance with the invention, the fermented products used as white material are diluted, for example, with the warm flavour preparation. Advantageously, the said warm flavour preparation represents between 1 and 50%, preferably between 20 and 50% by volume of the final product.

The addition of the warm flavour preparation before or after fermentation is carried out depending on the product which it is desired to obtain. For example, if it is desired to obtain a fermented product of the set yoghourt type, a flavour preparation will be added prior to the fermentation, which can be carried out in pots; if on the contrary it is a fermented product of the stirred type which is desired, a preparation of the chosen flavour will be preferably added to the fermented product.

It is thus possible to obtain fermented products flavoured with chocolate, caramel, praline and the like, or with a mixture of these flavours, by adding preparations of the corresponding flavours.

The flavour preparation may optionally contain, in addition to the flavour or the flavours chosen, various additives such as fats (for example cream and/or vegetable fat) emulsifiers, thickeners and the like.

Syrups, powders or flavoured extracts can also be used.

The flavoured fermented dairy products in accordance with the invention may be in particular stirred yoghourts, set yoghourts, drinking yoghourts, fromage frais, fermented milks, yoghourt- or fermented milk-based desserts and the like. These products can also be used as raw materials for the production of derived dairy products such as, for example, frozen dairy products (yoghourt ice creams), products of the spread type and the like.

The flavoured fermented dairy products in accordance with the invention have a low Dornic acidity, while preserving a pH <5, which makes it possible to ensure adequate food safety by preventing the development of a contaminating flora during the life of the product.

The fermented products in accordance with the invention may therefore contain live ferments, and may be preserved for the usual period for fresh products (28 days), without losing their organoleptic qualities; if desired, they can also undergo a heat treatment of the pasteurization or sterilization type (under the conditions defined above), in order to prolong their preservation.

The present invention will be understood more clearly with the aid of the additional description which follows, which refers to nonlimiting examples of preparation of flavoured fermented dairy products in accordance with the present invention.

It should be clearly understood, however, that these examples are given solely by way of illustration of the subject of the invention and do not constitute in any manner a limitation thereto.

EXAMPLE 1

Production of a Chocolate-Flavoured Stirred Yoghourt

A fully skimmed cow'milk was subjected to ultrafiltration on an inorganic membrane (TECH SEP, cut-off 15 kDa) until a protein content of 6.4% is obtained in the retentate (1st stage). This retentate is then carbonated at a temperature of about 4° C. with a quantity of $CO_2$ corresponding to a saturation pressure of 2 bar, up to a pH of about 5.5. Continuous diafiltration is then carried out under the following conditions: 2 volumes of water are added per volume of milk concentrated in the 1st stage, and the same volume is removed through the permeate as the volume of water added. This operation takes place continuously, and makes it possible to preserve the initial protein content of the retentate (6.4%).

Calcium and the other mineral salts are partially removed with the permeate, as well as a portion of the lactose and of the other soluble milk constituents. For example, for a skimmed milk containing initially 1230 ppm of calcium per 32.2 g/kg of protein, and 50 g/kg of lactose, a retentate containing 63 g/kg of protein and 1410 ppm of calcium, and 17 g/kg of lactose, is obtained under the carbonation and diafiltration conditions defined above, that is to say a reduction in the calcium content per gram of protein.

The lactose content of the retentate depends on the ratio between the mass of water added for the diafiltration and the mass of the retentate, as shown in Table I below:

TABLE I

| Mass added/mass of the retentate | Lf (%) | Dilution factor (Lf/Li) |
|---|---|---|
| 0 | 5.0 | 1 |
| 0.25 | 4.0 | 0.8 |
| 0.50 | 3.3 | 0.66 |
| 0.67 | 3.0 | 0.60 |
| 1.0 | 2.5 | 0.50 |
| 1.5 | 2.0 | 0.40 |
| 2.0 | 1.7 | 0.34 |
| 4.0 | 1.0 | 0.20 |

Lf = final lactose in the retentate
Li = initial lactose in the milk (theoretically 50 g/kg, that is to say 5%)

The retentate is then brought to atmospheric pressure, which causes removal of the $CO_2$, and then the degassing is continued under vacuum, until a rise in pH to 6.4 is obtained (at 25° C.).

The following ingredients are then added to the retentate (expressed in % by weight of the final mixture):

| | |
|---|---|
| waxy maize starch (hydroxypropylated) | 0.7 |
| gelatin* | 0.3 |
| water | 5.0 |
| sucrose | 3.0 |
| cream containing 40% fat | 2.0 |

Gel strength: 250 blooms = (250 grams)

The mixture is then subjected to a heat treatment at 95° C. for 4 minutes, and is then homogenized in an APV/RANNIE homogenizer, 120 1/hour (30 bar) and cooled to 43° C. before being inoculated with an *L. bulgaricus* and *S. thermophilus* culture.

The fermentation is carried out in an oven regulated at 43° C., until a pH of 4.6 to 4.7 is obtained. The fermentation is stopped by cooling the preparation to 20° C.

A mixture is prepared whose composition (in % w/w) is the following:

| | |
|---|---|
| cream containing 40% fat | 24.0 |
| waxy maize starch (native) | 3.5 |
| grated dark chocolate for crunching | 4.5 |
| cocoa powder containing 21% fat | 4.5 |

-continued

| | |
|---|---|
| sucrose | 27.5 |
| water qs | 100 |

The mixture is sterilized at 130° C. for 30 seconds, and after cooling is mixed with an equal weight of the fermented preparation.

The mixture is distributed into pots which are stored in a refrigerated and ventilated chamber (4° C.). The pH of the final product is about 5.2 for a Dornic acidity of about 45° D.

EXAMPLE 2

Production of a Chocolate-Flavoured Set Yoghourt

A fully skimmed cow'milk is ultrafiltered, and then carbonated, diafiltered and degassed, as indicated in Example 1.

The following ingredients (expressed in % by weight of the final mixture) are then added to the diafiltration retentate:

| | |
|---|---|
| grated dark chocolate for crunching | 4.0 |
| cocoa powder containing 21% fat | 0.4 |
| cream containing 40% fat | 8.5 |
| sucrose | 16.0 |
| water | 10.0 |

The mixture is then subjected to a heat treatment at 95° C. for 4 minutes, and is then homogenized in an APV/RANNIE homogenizer, 120 l/hour (200 bar), and cooled to 43° C. before being inoculated with an *L. bulgaricus* and *S. thermophilus* culture.

The fermentation is carried out in pots in an oven regulated at 43° C., until a pH of 4.6 to 4.8 is obtained. The fermentation is stopped by cooling the pots to 4° C.

The pots are stored in a refrigerated and ventilated chamber (4° C.). The pH of the final product is about 4.75 for a Dornic acidity of about 65° D.

EXAMPLE 3

Stirred Chocolate Yoghourt

Process of Preparation

1. Preparation of the white mass:

5-fold concentration of skimmed milk by tangential ultrafiltration on an inorganic membrane;

4.9-fold dilution of the retentate with water (soft or demineralized) to 3.35% protein;

addition of cream containing 40% fat in an amount of 14% of the volume of dilute retentate, and of 8% sugar;

pasteurization 4' at 95° C. and homogenization;

fermentation, in an oven, of this mixture cooled to 43° C. with an *L. bulgaricus* and *S. thermophilus* culture until a pH of 4.6 to 4.7 is obtained;

cooling to 20° C.

2. Preparation of a chocolate-flavoured mixture, according to the composition indicated below, and sterilization; Composition of the chocolate preparation (% w/w):

| | |
|---|---|
| cream containing 40% fat | 26.5 |
| chocolate 60/40 | 60 |
| invert sugar | 13 |
| salt | 0.4 |
| vanillin | 0.1 |

3. Mixing of the white mass (at 20° C. approximately) with the chocolate-flavoured preparation (at 35° C. approximately) in the respective proportions of 80 and 20% (% w/w);

packaging in pots and refrigeration at 4°C.

Characteristics of the Product

Final pH=about 4.9;

Acidity=55 degrees Dornic approximately;

Viscosity=1000 to 2000 mPa.s according to the intensity of the shearing stress applied.

EXAMPLE 4

Demineralized Milk-based Set Chocolate Yoghourt

Process of Preparation diafiltration by a factor of 2 (2 volumes of water are added to 1 volume of milk and 2 volumes of permeate are recovered) of skimmed milk (tangential ultrafiltration on an inorganic membrane);

the following ingredients are added (the quantites are given in % in the finished product), to the diafiltered milk:

| | |
|---|---|
| grated dark chocolate for crunching | 4% |
| cocoa powder (containing 21% fat) | 0.40% |
| cream containing 40% fat | 8.50% |
| sucrose | 16% |
| waxy maize native starch | 0.30% | pasteurization 4' at 95° C. and homogenization;

fermentation of this chocolate-flavoured mixture cooled to 43° C. (in pots) in an oven with an *L. bulgaricus* and *S. thermophilus* culture until a pH of 4.6 approximately is obtained;

cooling of the yoghourts to 4° C.

Characteristics of the Product

Final pH=about 4.75;

Acidity=40 degrees Dornic approximately;

Gel strength=about 400 N.m;

EXAMPLE 5

Stirred Yoghourt-type, Chocolate-flavoured Fermented Milk

Process of Preparation

1. White mass: preparation of the following mixture (% w/w):

| | |
|---|---|
| skimmed milk | 84% |
| skimmed milk powder | 0.90% |

| | |
|---|---|
| cream containing 40% fat | 6.75% |
| sodium caseinate | 1.15% |
| sugar | 7% | pasteurization 4' at 95° C. and homogenization;

fermentation, in an oven, of this mixture cooled to 38° C. with a culture of *L. bulgaricus* and *S. thermophilus* until a pH of 4.6 to 4.7 is obtained;

cooling to 20° C.

2. Preparation of a chocolate-flavoured mixture according to the composition indicated below, and sterilization:

| | |
|---|---|
| cream containing 40% fat | 26.5 |
| chocolate 60/40 | 60 |
| invert sugar | 13 |
| salt | 0.4 |
| vanillin | 0.1 |

3. Mixing of the white mass (at 20°C. approximately) with the chocolate-flavoured preparation (at 35° C. approximately) in the respective proportions of 75 and 25% (% w/w);

packaging in pots and refrigeration at 4° C.

Characteristics of the Product

Final pH=about 4.8;

Acidity=53 degrees Dornic approximately;

Viscosity=1000 to 2000 mPa.s according to the intensity of the shearing stress applied.

EXAMPLE 6

Chocolate-flavoured Drinking Fermented Milk

Process of Preparation diafiltration of skimmed milk by a factor of 2 (2 volumes of water for one volume of milk);

mixing: 93.7% of this diafiltered milk, 5% cream containing 40% fat and 1.3% sugar syrup at 67%;

pasteurization 4' at 95° C. and homogenization;

cooling to 38° C. and fermentation by the yoghourt ferments;

cooling to 20° C. and mixing with the chocolate-flavoured preparation of Example 3 in the proportions 90/10.

Characteristics of the Product

40° Dornic approximately at pH 4.65;

Viscosity=about 55 mPa.s.

EXAMPLE 7

Chocolate-flavoured Fromage Frais

Process of Preparation 2.15-fold concentration of milk by tangential ultrafiltration on an inorganic membrane to 7.1% protein;

diafiltration of the retentate 3 times with water (3 volumes of water are added to one volume of retentate and 3 volumes of permeate are recovered);

storage overnight at 4° C. of the diafiltered retentate;

addition of fat (cream), and of sugar, in order to obtain the following mixture:

| | |
|---|---|
| 7.1% protein | 81.8% |
| skimmed milk powder | 1.4% |
| cream containing 40% fat | 9.8% |
| sugar | 7% | pasteurization 4' at 95° C. and homogenization;

fermentation, in an oven, of this mixture cooled to 40° C., with an *S. thermophilus* culture until a pH of 4.6 is obtained;

cooling to 20° C./smoothing of the stirred yoghourt type with various possible shearing stresses depending on the desired viscosity;

preparation and sterilization of a chocolate-flavoured mixture (see Example 3);

mixing of the white mass (at 20° C. approximately) with the chocolate-flavoured preparation (at 35° C. approximately) in the respective proportions of 75 and 25% (% w/w);

packaging in pots and refrigeration at 4° C.

Characteristics of the Product

Final pH=about 4.7;

Acidity=70 degrees Dornic approximately;

Viscosity=about 1000 to 2500 mPa.s according to the intensity of the shearing stress applied.

What is claimed is:

1. A method for reducing the buffering capacity of milk raw material, wherein said method comprises (a) solubilizing carbon dioxide under pressure into a milk raw material, which has a protein concentration of between 25 and 150 g/l, in an amount sufficient to reduce the pH of the material to within the range of 5 to 6.5;

(b) subjecting the product of step (a) to diafiltration under carbon dioxide pressure and conditions sufficient to reduce the calcium quantity per gram of protein to between 30% and 80% of its starting ratio;

(c) increasing the pH of the diafiltration retentate by removal of a sufficient amount of the solubilized carbon dioxide as necessary to obtain a pH that falls within the normal pH range for non-carbonated milk products which have the same protein content as the retentate.

2. The method of claim 1 wherein the amount of solublized carbon dioxide added to the raw milk material in step (a) is sufficient to reduce the pH to between 5 and 5.8.

3. The method of claim 1 wherein the diafiltration of step (b) is conducted under conditions that reduce the calcium quantity per gram of protein to between 40% and 70% of its starting ratio.

4. A method of producing a flavoured fermented dairy product comprising a warm flavour comprising:

(a) preparing the starting material including reducing the buffering capacity of the milk raw material according to the method of claim 1, (b) fermenting with at least one lactic acid fermenting agent; and (c) admixing a flavour preparation comprising at least one warm flavour.

5. The method of claim 4, wherein the admixing of the flavour preparation precedes the fermenting step.

6. The method of claim 4, wherein the lactic acid fermenting agent is selected from the group of bacteria consisting of Lactobacillus sp., Lactococcus sp. and Bifidobacterium sp.

7. The method of claim 4 wherein the flavour preparation is admixed in an amount sufficient to provide between 1% and 50% of the final product.

8. The method of claim 4, wherein the flavoured fermented dairy product has a Dornic acidity of between 20 and 80 degrees Dornic and the pH is between 4 and 5.5.

9. The method of claim 8, wherein the Dornic acidity is between 30 and 70 degrees Dornic and the pH is between 4.5 and 4.9.

10. The method of claim 9, wherein the Dornic acidity is between 40 and 60 degrees Dornic.

11. The method of claim 4, wherein the warm flavour is selected from the group consisting of chocolate, caramel, vanilla, coffee, praline, nougat, walnut, hazelnut, almond, pistachio nut and cashew nut flavours.

12. The method of claim 4, wherein the protein content is between 1% and 10%.

\* \* \* \* \*